US010167165B2

(12) United States Patent
Binger et al.

(10) Patent No.: US 10,167,165 B2
(45) Date of Patent: Jan. 1, 2019

(54) STOCK ROLLS CONTAINING A FIRST FOLDED FILM WITHIN A SECOND FOLDED FILM AND METHODS OF MAKING THE SAME

(71) Applicant: The Glad Products Company, Oakland, CA (US)

(72) Inventors: Scott W. Binger, Willowbrook, IL (US); Donald E. Wogelius, Kennesaw, GA (US); Jason R. Maxwell, Willowbrook, IL (US)

(73) Assignee: The Glad Products Company, Oakland, CA (US)

( * ) Notice: Subject to any disclaimer, the term of this patent is extended or adjusted under 35 U.S.C. 154(b) by 369 days.

(21) Appl. No.: 14/773,000

(22) PCT Filed: Mar. 12, 2014

(86) PCT No.: PCT/US2014/024431
§ 371 (c)(1),
(2) Date: Sep. 4, 2015

(87) PCT Pub. No.: WO2014/165112
PCT Pub. Date: Oct. 9, 2014

(65) Prior Publication Data
US 2016/0016751 A1    Jan. 21, 2016

Related U.S. Application Data

(60) Provisional application No. 61/779,877, filed on Mar. 13, 2013.

(51) Int. Cl.
| | | |
|---|---|---|
| B65H 35/02 | (2006.01) | |
| B29C 47/00 | (2006.01) | |
| B29C 47/06 | (2006.01) | |
| B29C 47/88 | (2006.01) | |
| B65H 18/08 | (2006.01) | |
| B65H 18/28 | (2006.01) | |
| B65H 37/06 | (2006.01) | |

(52) U.S. Cl.
CPC ......... *B65H 35/02* (2013.01); *B29C 47/0021* (2013.01); *B29C 47/0026* (2013.01); *B29C 47/0057* (2013.01); *B29C 47/0064* (2013.01); *B29C 47/065* (2013.01); *B29C 47/8835* (2013.01); *B65H 18/08* (2013.01); *B65H 18/28* (2013.01); *B65H 37/06* (2013.01); *B65H 2301/41485* (2013.01); *B65H 2701/1864* (2013.01)

(58) Field of Classification Search
None
See application file for complete search history.

(56) References Cited

U.S. PATENT DOCUMENTS

| | | | | |
|---|---|---|---|---|
| 3,871,269 A | * | 3/1975 | Jones | B65H 29/46 493/13 |
| 4,263,347 A | * | 4/1981 | Banta | E04G 21/30 427/282 |
| 4,273,549 A | | 6/1981 | Pezzana et al. | |
| 4,795,415 A | * | 1/1989 | Francis | A01G 9/1407 493/409 |
| 5,709,641 A | | 1/1998 | Vaquero | |
| 5,804,020 A | * | 9/1998 | Akao | B29C 65/02 156/251 |
| 6,124,018 A | * | 9/2000 | Yoshino | B05B 12/24 428/122 |
| 2009/0104388 A1 | * | 4/2009 | Hall | B65F 1/0006 428/35.2 |
| 2012/0039550 A1 | | 2/2012 | MacPherson et al. | |
| 2012/0064271 A1 | | 3/2012 | Broering et al. | |
| 2012/0269465 A1 | | 10/2012 | Dorsey et al. | |
| 2013/0059711 A1 | | 3/2013 | Broering | |
| 2013/0188891 A1 | * | 7/2013 | Maxwell | B65F 1/0006 383/75 |

FOREIGN PATENT DOCUMENTS

| | | |
|---|---|---|
| DE | 2010354 A * | 10/1971 |
| DE | 3341541 A1 * | 6/1985 |
| WO | WO-97/03552 A1 * | 2/1997 |

OTHER PUBLICATIONS

International Search Report, dated Jul. 14, 2014, from counterpart PCT/US 14/024431, filing date Mar. 12, 2014.

* cited by examiner

*Primary Examiner* — Jeffry H Aftergut
(74) *Attorney, Agent, or Firm* — Thomas C. Feix

(57) ABSTRACT

Methods for forming a stock roll including a folded film within another folded film include combining the films and winding them into the stock roll. In particular, one or more implementations of a method of forming a stock roll involve combining films on an extrusion tower. Thus, implementations of the present invention can greatly reduce costs and space requirements, while allowing a single stock roll to feed a bag-making machine in order to produce bag-in-bag structures. One or more implementations further include stock rolls including a first folded film within another folded film.

20 Claims, 12 Drawing Sheets

STOCK ROLLS CONTAINING A FIRST FOLDED FILM WITHIN A SECOND FOLDED FILM AND METHODS OF MAKING THE SAME

BACKGROUND OF THE INVENTION

1. The Field of the Invention

The present invention relates generally to webs and films. Specifically, the invention relates to methods of creating a stock roll including a folded film or web within another folded film or web.

2. Background and Relevant Art

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

Thermoplastic films have a variety of different strength parameters that manufacturers of products incorporating a thermoplastic film component may attempt to manipulate to ensure that the film is suitable for use its intended use. For example, manufacturers may attempt to increase or otherwise control the tensile strength of a thermoplastic film. The tensile strength of a thermoplastic film is the maximum stress that a film can withstand while being stretched before it fails. Another strength parameter that manufacturers may want to increase or otherwise control is tear resistance. The tear resistance of a thermoplastic film is the amount of force required to propagate or enlarge a tear that has already been created in a film. Still further, a manufacturer may want to increase or otherwise control a film's impact resistance.

When forming various products from thermoplastic films, a manufacturer may fold the thermoplastic film in half (or otherwise create a folded film) and use the folded film to produce a product. For example, the manufacturer may use a folded film to create a bag. In particular, the manufacturer may seal the sides of the folded film adjacent the fold. The sealed sides and the bottom fold may form the three joined sides of a bag.

Recent developments in bag technology have discovered that bags having a bag-in-bag construction can provide many advantages over conventional bags. To form such bag-in-bag products it is often desirable run a first film folded nested within a second folded film through a bag-making machine. The machine can seal the sides of the folded films adjacent the folds to form a doubled-layered bag.

Unfortunately, conventional methods for combining folded films have various disadvantages that lead to undesirable conditions. For example, conventional methods for combining folded films may require significant machine width to handle wide webs and machine direction length to fold the films. Furthermore, conventional methods for combining folded films may lead to web handling and wrinkle issues that are undesirable. In addition to the foregoing, it may be necessary to redesign or significantly modify existing manufacturing processes and machinery by adding additional stations for folding and inserting the second film within the first film. Due to space and cost constraints, this is often undesirable or impractical.

Accordingly, there are a number of considerations to be made in thermoplastic films and manufacturing methods.

BRIEF SUMMARY OF THE INVENTION

One or more implementations of the present invention provide benefits and/or solve one or more of the foregoing or other problems in the art with methods for creating a stock roll including a folded film within another folded film. The stock roll can then be unwound from a single unwind and fed into a bag-making machine without having to add to or significantly revise the bag making machine. In particular, the stock roll can avoid having to provide multiple unwinds feeding into the bag-making machine or having to provide additional space and stations for folding and inserting films within each other. Thus, one or more implementations can result in conservation of floor space in manufacturing; thereby, resulting in lowered capital costs.

For example, an implementation of a method for forming a stock roll including a first folded film inserted within a second folded film can involve slitting a thermoplastic tube to form a first continuous thermoplastic film and at least a second continuous thermoplastic film. The method can also involve folding one or more of the first continuous thermoplastic film and the at least a second continuous thermoplastic film. In particular, the first and second continuous films can be folded to form a multi-layer composite folded film comprising an inner folded layer and an outer folded layer folded about the inner folded layer.

Additionally, in another implementation, a stock roll for use in forming bag-in-bag structures can include a first film and a second film. The first film is wound lengthwise about a tube roll. The first film is also folded in half lengthwise. The first film includes a folded edge and first and second opposing portions extending from the folded edge. The second film is also wound lengthwise about the tube roll. Similar to the first film, the second film is folded in half lengthwise, and includes a folded edge and first and second opposing portions extending from the folded edge. The second film is positioned within the first film.

In addition to the foregoing, a method of producing a multi-layered thermoplastic bag can involve unwinding a multi-layer composite folded film from a single roll. The multi-layer composite folded film can comprise a first folded film positioned with a second folded film. The method can additionally involve directing the multi-layer composite folded film into a bag-making machine. The method can further involve sealing intermittent portions of the first folded film to the second folded film within the bag-making machine.

Additional features and advantages of exemplary embodiments of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1C:
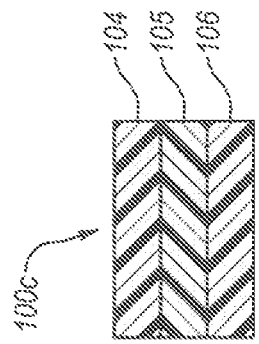
FIGS. 1A-1C illustrate views of various films structures in accordance with one or more implementations of the present invention.

One or more implementations of the present invention include methods for creating a stock roll including a folded film within another folded film. The stock roll can then be unwound from a single unwind and fed into a bag-making machine without having to add to or significantly revise the bag making machine. In particular, the stock roll can avoid having to provide multiple unwinds feeding into the bag-making machine or having to provide additional space and stations for folding and inserting films within each other. Thus, one or more implementations can result in conservation of floor space in manufacturing; thereby, resulting in lowered capital costs.

Additionally, one or more implementations provide efficient systems and methods for combining folded films. The reduction in process steps by eliminating the need for additional stations in the bag conversion process can allow for increased reliability and a reduction or elimination of wrinkles in resulting product(s). Furthermore, one or more implementations can combine folded films effectively and efficiently without compromising important material properties of the product, such as tear and puncture resistance.

One or more implementations of the present invention can be practiced on an extrusion tower. Combining folded films into a stock roll on an extrusion tower can require minimal space and machinery, thereby, lowering capital costs and avoiding the need to revise current bag making lines. Additional implementations can involve combining folded films in a separate folding/winding operation prior to feeding the films into a bag machine. In any event, one or more implementations can reduce capital costs by using a single extrusion line to supply multiple bag-making machines. Thus, one or more implementations can avoid having to supply dual unwinds and insertions assemblies for each bag-making machine.

One or more implementations of the present invention further allows for a stock roll that maintains different inside and outside surfaces in the stock roll. In particular, recent developments have discovered that double-walled bags with different outer and inner layers can provide significant advantages. For example, double-walled bags with differently colored inner and outer layers can provide various aesthetic advantages. Additionally, double-walled bags with outer layers having extruded ribs can provide for increased strength. One or more implementations of the present invention allow for the creation of a stock roll with a folded film nested within another folded film that maintains an outer surface and an inner surface allowing for the formation of a bag-in-bag with different inner and outer surfaces or layers.

Film Materials

As a preliminary matter, implementations of the present invention are described herein primarily with reference to processing and combining of thermoplastic films or webs. One will appreciate, however, that thermoplastic films or webs, are only one type of "structure" which a user may process using the components, systems, and methods described herein. For example, a stock roll can include not only thermoplastic films, as such, but also paper, woven or non-woven fabrics, or other structures. Reference herein, therefore, to thermoplastic films or webs, as such, is primarily for convenience in description.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In one or more implementations web materials are provided which exhibit an "elastic-like" behavior in the direction of applied strain without the use of added traditional elastic. As used herein, the term "elastic-like" describes the behavior of web materials which, when subjected to an applied strain, the web materials extend in the direction of applied strain, and when the applied strain is released the web materials return, to a degree, to their pre-strained condition.

Indeed, implementations of the present invention can include any flexible or pliable thermoplastic material that may be formed or drawn into a web or film. Furthermore, the thermoplastic materials may include a single layer or multiple layers. Examples of multi-layered films suitable for use with one or more implementations of the present invention include coextruded multi-layered films, multiple films continuously laminated together, and multiple films partially or discontinuously laminated together. The thermoplastic material may be opaque, transparent, translucent, or tinted. Furthermore, the thermoplastic material may be gas permeable or impermeable.

The films of one or more implementations of the present invention can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. In further implementations, the starting gauge of the films may be greater than about 20 mils. Additionally, the starting gauge of films of one or more implementations of the present invention may not be uniform. Thus, the starting gauge of films of one or more implementations may vary along the length and/or width of the film.

Figure 1B:
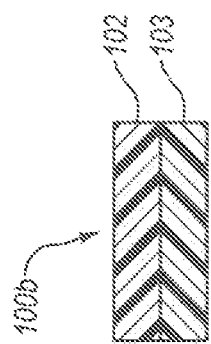
Figure 1A:

FIG. 1A illustrates a film ply 100a of a single layer 101. In another implementation, as illustrated by FIG. 1B, a film ply 100b can have two layers (i.e., a bi-layered film). In particular, the film ply 100b can include a first layer 102 and a second layer 103. The first and second layers 102, 103 can optionally include different grades of thermoplastic material or include different additives, including polymer additives. In still another implementation, shown in FIG. 1C, a film ply 100c can include three layers (i.e., a tri-layered film). For example, FIG. 1C illustrates that the film 100c can include a first layer 104, a second layer 105, and a third layer 106.

As described above, the films 100a-100l referred to herein may include one or a plurality of thermoplastic layers. In addition to thermoplastic materials, the films 100a-100l can include additives, as desired (e.g., pigments, slip agents, anti-block agents, tackifiers, or combinations thereof). The thermoplastic material of the film 100a-100l of one or more implementations can include, but are not limited to, thermoplastic polyolefins, including polyethylene, polypropylene, and copolymers thereof. Besides ethylene and propylene, exemplary copolymer olefins include, but are not limited to, ethylene vinylacetate (EVA), ethylene methyl acrylate (EMA) and ethylene acrylic acid (EAA), or blends of such olefins. Various other suitable olefins and polyolefins will be apparent to one of skill in the art.

In at least one implementation, such as shown in FIG. 1C, a multilayered film 100c can include co-extruded layers. For example, the film 100c can include a three-layer B:A:B structure, where the ratio of layers can be 20:60:20. The exterior B layers (i.e., 104, 106) can comprise a mixture of hexene LLDPE of density 0.918, and metallocene LLDPE of density 0.918. The interior A core layer (105) can comprise a mixture of hexene LLDPE of density 0.918, butene LLDPE of density 0.918, reclaimed resin from trash bags. Additionally, the A core layer 105 can optionally include a colorant containing carbon black, resulting in a black colored film.

In another implementation, the film 100c is a coextruded three-layer B:A:B structure, where the ratio of layers is 20:60:20. The exterior B layers (104, 106) can comprise hexene LLDPE of density 0.918, and metallocene LLDPE of density 0.918. The interior A core layer (105) can comprise hexene LLDPE of density 0.918, metallocene LLDPE of density 0.918, butene LLDPE of density 0.918, reclaimed resin from trash bags. The A core layer 105 can also include a processing aide, colorant containing carbon black, and colorant containing white TiO2, resulting in a grey colored film. In some implementations, the carbon black or reclaimed resin can be omitted, resulting in a white colored film.

In another example, the film 100c is a coextruded three-layer B:A:B structure where the ratio of layers is 15:70:15. The A core layer 105 can comprise a LLDPE material, and the B outer layers 104, 106 can include added C6 olefin LLDPE. The LLDPE material can have a MI of 1.0 and density of 0.920 g/cm3. The B:A:B structure can also optionally have a ratio of B:A that is greater than 20:60 or less than 15:70. In one or more implementations, the LLDPE can comprise greater than 50% of the overall thermoplastic material in the film 100c.

In another example, the film 100c is a coextruded three-layer C:A:B structure where the ratio of layers is 20:60:20. The C layer 104 can comprise a LLDPE material with a first colorant (e.g., black). The B layer 106 can also comprise a LLDPE material with a second colorant (e.g., white). The LLDPE material can have a MI of 1.0 and density of 0.920 g/cm3. The A core layer 105 can comprise similar materials to any of the core layer describe above. The A core layer 105 can comprise a white colorant or can be clear. As explained in below, this film structure can allow for a bag-in-bag with an outer surface or layer of black and an inner surface or layer of white.

In at least one implementation of the present invention, the film 100a-100l can preferably include linear low-density polyethylene. The term "linear low density polyethylene" (LLDPE) as used herein is defined to mean a copolymer of ethylene and a minor amount of an alkene containing 4 to 10 carbon atoms, having a density of from about 0.910 to about 0.926 g/cm3, and a melt index (MI) of from about 0.5 to about 10. For example, one or more implementations of the present invention can use an octene co-monomer, solution phase LLDPE (MI=1.1; ρ=0.920). Additionally, other implementations of the present invention can use a gas phase LLDPE, which is a hexene gas phase LLDPE formulated with slip/AB (MI=1.0; ρ=0.920). One will appreciate that the present invention is not limited to LLDPE, and can include "high density polyethylene" (HDPE), "low density polyethylene" (LDPE), and "very low density polyethylene" (VLDPE). Indeed films made from any of the below mentioned thermoplastic materials or combinations thereof can be suitable for use with the present invention.

Such thermoplastic materials can include, but are not limited to, thermoplastic polyolefins, including polyethylene and copolymers thereof and polypropylene and copolymers thereof. The olefin-based polymers including ethylene or propylene based polymers such as polyethylene, polypropylene, and copolymers such as ethylene vinyl acetate (EVA), ethylene methyl acrylate (EMA) and ethylene acrylic acid (EAA), or blends of such polyolefins. Other examples of polymers suitable for use as films include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly (ethylene-vinyl acetate), poly(ethylene-methyl acrylate), poly(ethylene-acrylic acid), poly(ethylene butyl acrylate), polyurethane, poly(ethylene-propylene-diene), ethylene-propylene rubber.

Other examples of polymers suitable for use as films in accordance with the one or more implementations of the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinyl acetate), poly(ethylene-methyl acrylate), poly(ethylene-acrylic acid), poly(ethylene butyl acrylate), polyurethane, poly(ethylene-propylene-diene), ethylene-propylene rubber, and combinations thereof.

In addition to the foregoing, one will appreciate in light of the disclosure herein that manufacturers may form the films or webs 100a-100l using a wide variety of techniques. For example, a manufacturer can form the films 100a-100l using conventional flat or cast extrusion or co-extrusion to produce mono-layer, bi-layer, or multi-layer films. Alternatively, a manufacturer can form the films 100a-100l using suitable processes, such as, a blown film process to produce mono-layer, bi-layer, or multi-layer films. If desired for a given end use, the manufacturer can orient the films by trapped bubble, tenterframe, or other suitable process. Additionally, the manufacturer can optionally anneal the films.

In one or more implementations an extruder can be used to form the film. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present invention, can be a single screw type modified with a blown film die, an air ring, and continuous take off equipment. In one or more implementations, a manufacturer can use multiple extruders to supply different melt streams, which a feed block can order into different channels of a multi-channel die. The multiple extruders can allow a manufacturer to form a multi-layered film with layers having different compositions, such as the various implementations of the film 100c described above.

Figure 2:
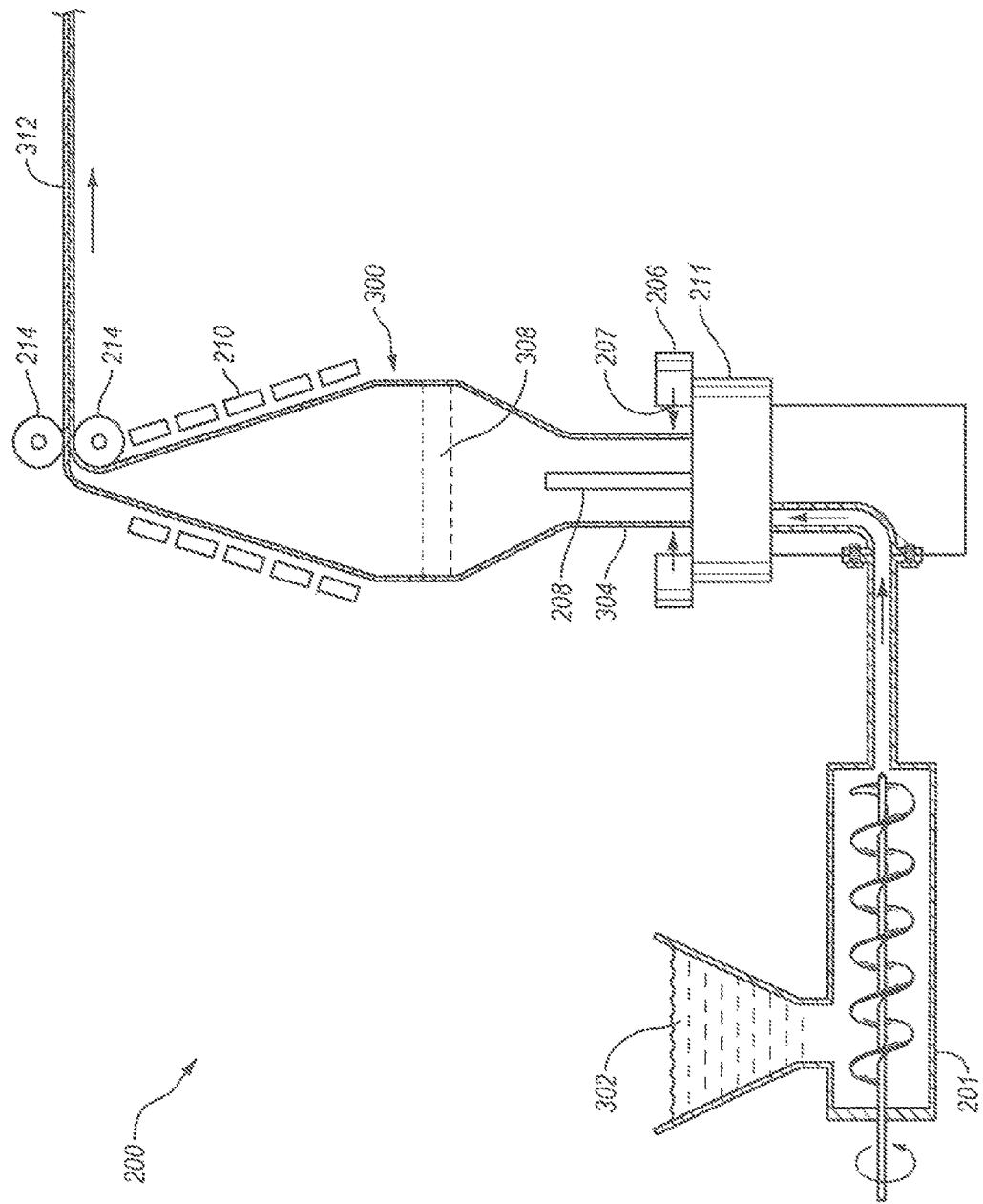
FIG. 2 shows a schematic side-view of a blow molding extruder for producing a blow-formed continuous film tube of thermoplastic material in accordance with one or more implementations of the present invention.
Figure 3:
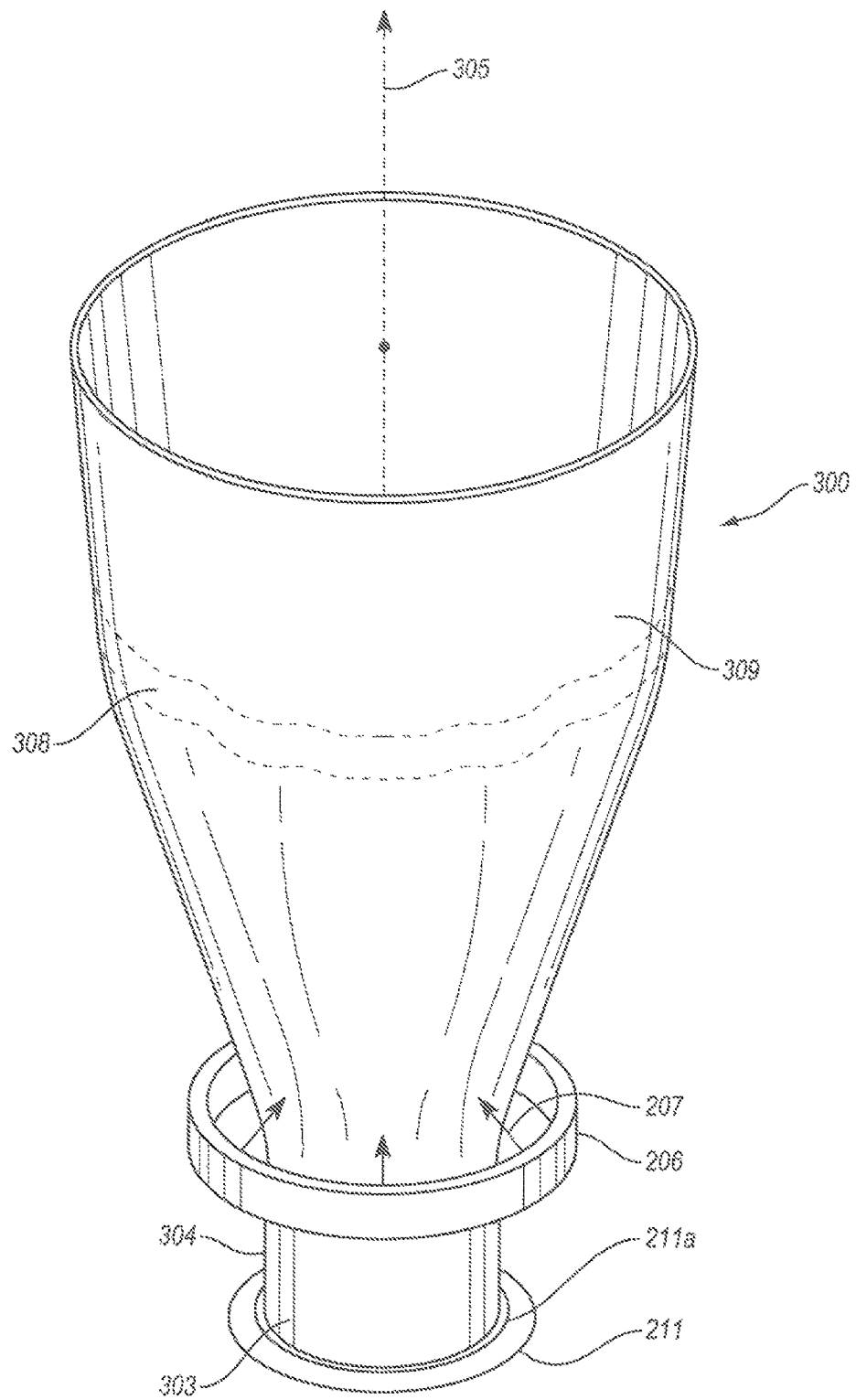
FIG. 3 shows a perspective view of a portion of a blow-formed continuous film tube formed in the extruder of FIG. 2 in accordance with one or more implementations of the present invention.

FIG. 2 illustrates a schematic sectional, side view of a blown film extrusion system 200 used to produce a blown-formed continuous film tube 300 of polyethylene or other thermoplastic material. FIG. 3 illustrates a perspective view of a portion of the film tube 300 formed by the extrusion process 200 of FIG. 2. Processes for the manufacture of blown film tubes are generally known. Blown film extrusion processes are described, for example, in U.S. Pat. Nos. 2,409,521, 2,476,140, 2,634,459, 3,750,948, 4,997,616, 5,213,725, and 5,700,489; each of which is incorporated herein by reference in their entirety.

Referring to FIGS. 2 and 3 together, in a blown film extrusion system, molten plastic melt 302 is first created and pumped by an extruder 201 (FIG. 2). The plastic melt 302 is fed into an annular die 211 that has a ring-shaped output die gap 211a (FIG. 3), usually referred to as a "die gap", through which the plastic melt 302 flows.

In the blown film extrusion process, the plastic melt 302 is extruded from the output die gap 211a (FIG. 3) of the die 211 to form a molten bubble, some times referred to as a tubular stalk 304. The tubular stalk 304 can thereafter be expanded to fully form a continuous cylindrically shaped film tube 300 exiting and moving away from the die 211. As shown in FIGS. 2 and 3, film tube 300 includes a tube central axis 305 along the length of film tube 300. The film tube 300 also includes an outside surface 309. By blowing air into the inside of the moving tubular stalk 304 through a pressurizing pipe 208 (FIG. 2) within the interior of stalk 304, a pressure is produce inside the tubular stalk 304 that is higher than the external pressure outside the tubular stalk 304. The higher inside pressure causes the moving tubular stalk 304 to expand into the fully formed continuous cylindrical web of the film tube 300.

As shown, an annular shaped air ring cooler 206, circumscribing stalk 304, blows cooling air, as indicated by arrows 207, toward the outside surface 303 of stalk 304 to rapidly cool and aerodynamically support the moving molten plastic melt 302 forming tubular stalk 304. By regulating the temperature of the cooling air exiting air ring cooler 206 and other manufacturing parameters, a frost line region 308 is established circumferentially at a static location on the extruder 201. The frost line region 308 is the location beyond the air ring cooler 206 where the molten plastic melt 302 forming the film tube 300 solidifies through cooling as film tube 300 moves away from air ring cooler 206. At this frost line region 308, film tube 300 no longer expands since the molten plastic melt 302 forming film tube 300 is solidified. The continuous web of film tube 300 is collapsed at a collapsing frame 210 (FIG. 2) and subsequently formed into a flat web 312 (FIG. 2) at nip rollers 214.

Figure 4A:
FIGS. 4A-4D illustrate steps in a process for forming multi-layer composite folded films from the blow-formed continuous film tube formed in the extruder of FIG. 2 in accordance with one or more implementations of the present invention.
Figure 4B:
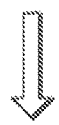
Figure 4B:
Figure 4C:
Figure 4C:
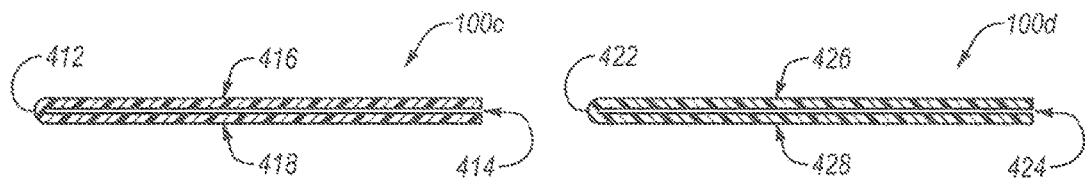

In accordance with a first implementation of the present invention, a manufacturer can slit the flat tube 312 at the edges 400, 402 of the collapsed tube to form two flat films 100c, 100d, as shown by FIGS. 4A-4B. Various well know means may be used to slit film tube 312. Once slit, a manufacturer can pass the films 100c, 100d over a v-board to form two folded films, as shown in FIG. 4C.

As illustrated, the folded film 100c can comprise a folded edge 412, an open edge 414, a first half or portion 416, and a second half or portion 418. Similarly, the folded film 100d can comprise a folded edge 422, an open edge 424, a first half or portion 426, and a second half or portion 428. Thus, as shown, each of the folded films 100c, 100d (and the other folded films described herein) can comprise a "c," "j," or "u" configuration. As such, the folded films 100c, 100d may be referred to herein as c-folded, j-folded films, or u-folded films. C-folded films can comprise films that are symmetrical about their folded edge, while j- or u-folded films can comprise films that are not symmetrical about their folded edge (i.e., one of the halves extend farther than the other).

In an alternative implementation, the manufacturer can slit the flat tube 312 down the middle instead of at the edges 400, 402. By slitting the flat tube 312 down the middle, the manufacturer can form two folded films 100c, 100d, without the intermediate folding step shown by FIGS. 4B-4C.

Figure 4D:
Figure 4D:
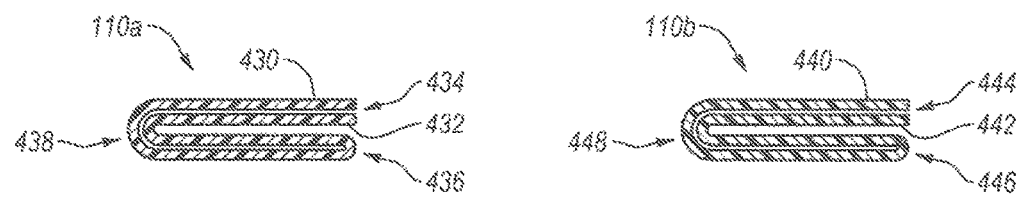

A manufacturer can then pass each of the folded films over another v-board to form multi-layer composite folded films 110a and 110b, as shown by FIG. 4D. The second half 418, 428 of each folded film 100c, 100d (FIG. 4C) can form the outer layer 430, 440 of the multi-layer composite folded films 110a and 110b. Similarly, the first half 416, 426 of each folded film 100c, 100d (FIG. 4C) can form the inner layer 432, 442 of the multi-layer composite folded films 110a and 110b.

The folded edges 412, 422, respectively, of each folded film 100c, 100d (FIG. 4C) can form a first end 434, 444 of the multi-layer composite folded films 110a and 110b. Similarly, the open edges 414, 424, respectively, of each folded film 100c, 100d (FIG. 4C) can form a second end 436, 446 of the multi-layer composite folded films 110a and 110b. Optionally, the manufacturer can slit the folded edges 412, 422 that form the second ends 436, 446.

In any event, the resulting multi-layer composite folded films 110a, 110b are each comprised of a second folded film 432, 442 inserted within a first folded film 430, 440. The resulting multi-layer composite folded films 110a, 110b each have a folded edge 438, 448 and opposing open ends 434, 436, 444, 446.

Figure 5:
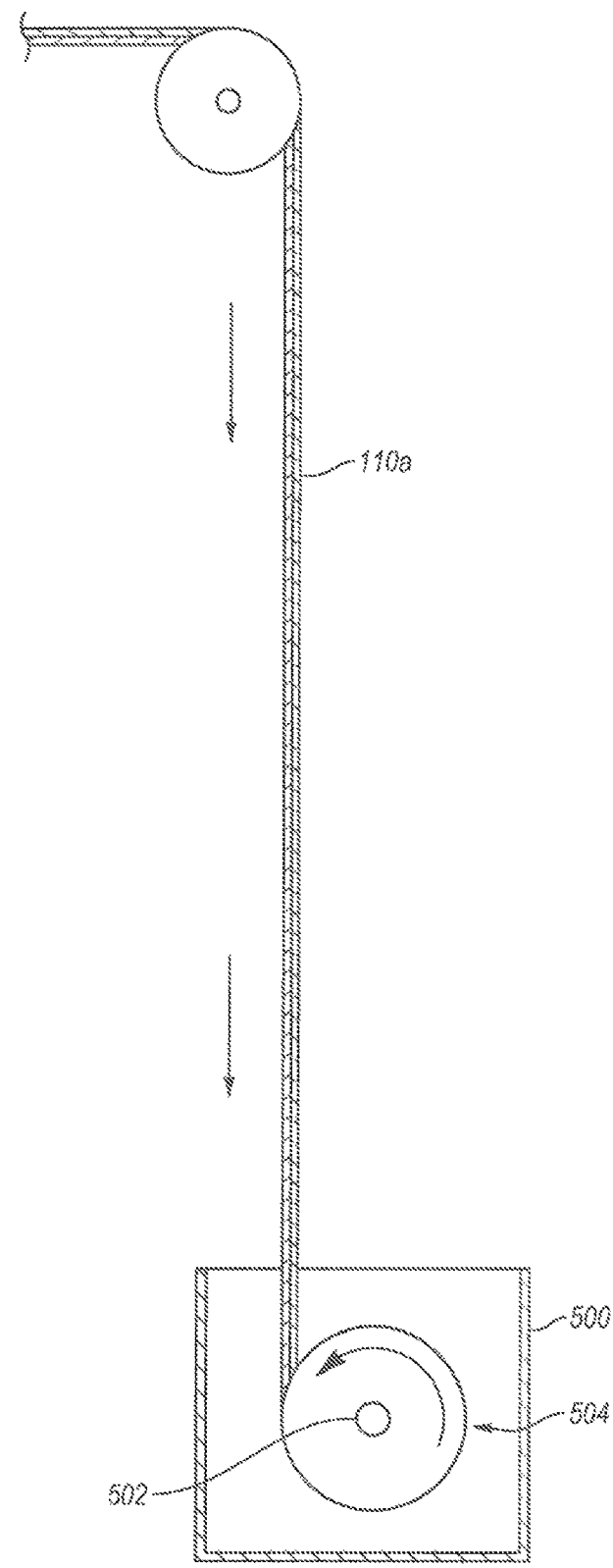
FIG. 5 illustrates a schematic side-view of a multi-layer composite folded film being wound into a stock roll in accordance with one or more implementations of the present invention.

As shown by FIG. 5, the continuous web of the multi-layer composite folded film 110a fully collapsed. The multi-layer composite folded film 110a is then wound onto a film tube roll 502 at a winder 500 to form a stock roll 504 including a folded film within another folded film.

The stock roll 504, thus, can comprise a multi-layer composite folded film 110a wrapped about itself. In other words, the stock roll 504 can comprise a folded film 432 (e.g., "c," "j," or "u" folded) nested or contained within another folded film 430 (e.g., "c," "j," or "u" folded). A manufacturer can then position the stock roll 504 at beginning of a continuous bag-making process. The stock roll 504 can be unwound to feed the multi-layer composite folded film 110a into a bag-making machine. The stock roll 504 can avoid the need add folding or inserting stations and processing to the beginning of a bag-making machine or process. One will appreciate that the ability to avoid the need to rework, reorder, or reposition existing machines and processes can reduce time and expense in making doubled-wall bags using conventional bag-making machinery.

Additionally, the method described in relation to FIGS. 4A-5 can be implemented within an extrusion tower. In other words, the blown film 312 can pass directly from the nip rollers 214 (FIG. 2) through the process outlined in FIGS. 4A-4D while still in the extrusion tower. In other words, the first time the flat tube 312 is wound can be on the film tube roll 502 as a stock roll 504 including a folded film within another folded film.

The method described in relation to FIGS. 4A-5 further illustrates that in one or more implementations of the present invention, one or more stock rolls 504 including a folded film within another folded film can be formed form a single film tube 312. For instance, the method described in relation to FIGS. 4A-5 involves forming two stock rolls 504 from a single film tube 312. In alternative implementations, a single or more than two stock rolls 504 can be formed from a single film tube 312.

It may be useful and beneficial to combine two or more folded films such that the folded edges of the outer film coincide with the folded edges of the inner film. Such films can be used to form multi-layered bags with no seam along the bottom of the bag. Instead of a seam, the fold 438, 448 of the films can form the bottom of the bag. In alternative implementations, the manufacturer can offset the folds 438, 448 such that an inner bag in a bag-in-bag structure is shorter than the outer bag of the bag-in-bag structure.

One will appreciate in light of the disclosure herein that the method described above in relation to FIGS. 4A-4D is only one implementation of forming a multi-layer composite folded film including a folded film within another folded film. For example, FIGS. 6A-6D illustrate another method of forming multi-layer composite folded films that can be wound to form stock rolls 504 including a folded film within another folded film.

Figure 6A:
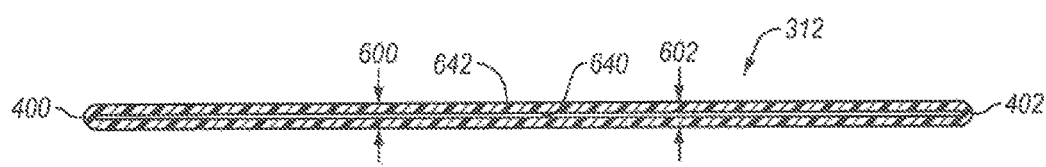
FIGS. 6A-6D illustrate steps in another process for forming multi-layer composite folded films from the blow-formed continuous film tube formed in the extruder of FIG. 2 in accordance with one or more implementations of the present invention.
Figure 6B:
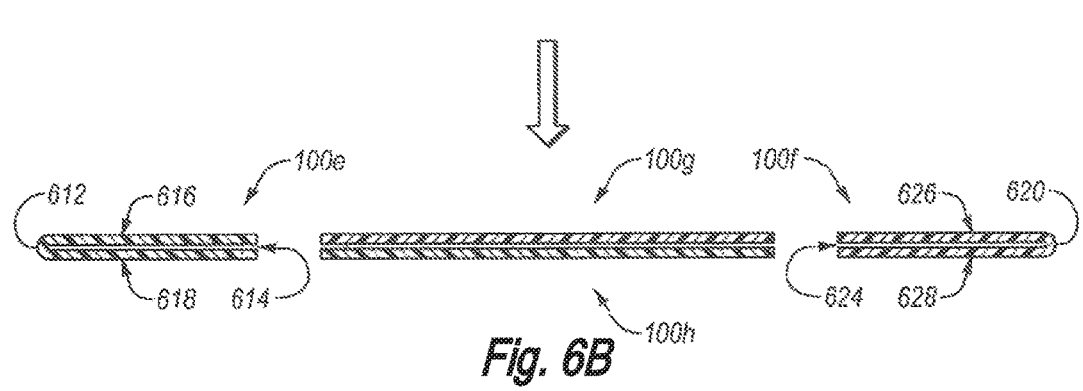
Figure 6C:
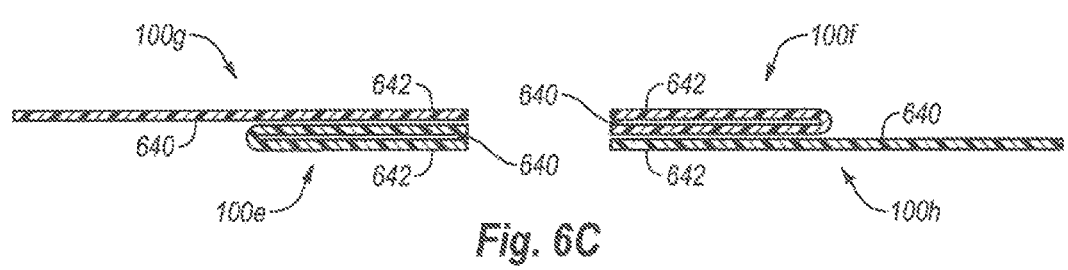

In particular, a manufacturer can slit the flat tube 312 at two positions 600, 602. Each of the slit positions 600, 602 can optionally be located a distance from an edge 400, 402 equal to about ¼ of the total distance from the first edge 400 to the second edge 402. The slit flat tube 312 can then form two c-folded films 100e, 100f, and two flat films 100g, 100h, as shown by FIGS. 6A-6B. Various well know means may be used to axially slit film tube 312. As shown by FIG. 6C, the c-folded film 100e can comprise a folded edge 462, an open edge 614, a first half 616, and a second half 618. Similarly, the c-folded film 100f can comprise a folded edge 622, an open edge 624, a first half 626, and a second half 628.

Figure 6D:
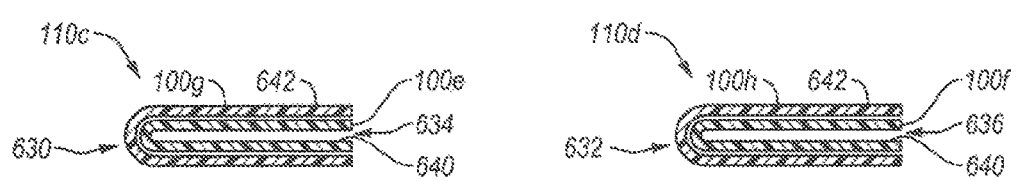

As shown by FIGS. 6C-6D, once the two c-folded films 100e, 100f and two flat films 100g, 100h are formed, the manufacturer can route the flat film 100g over the c-folded film 100e. The manufacturer can then fold the flat film 100g about the c-folded film 100e to form a multi-layer composite folded film 110c. Similarly, the manufacturer can route the flat film 100h under the c-folded film 100f. The manufacturer can then fold the flat film 100h about the c-folded film 100f to form a multi-layer composite folded film 110d.

The resulting multi-layer composite folded films 110c, 110d are each comprised of a folded film 100e, 100f inserted within another folded film 100g, 100h. The resulting multi-layer composite folded films 110c, 110d each have a folded edge 630, 632 and opposing open ends 634, 636. The manufacturer can then wind the multi-layer composite folded film 110c, 110d onto a film tube roll 502 at a winder 500 to form a stock roll 504 including a folded film within another folded film, as shown by FIG. 5.

Thus, the stock roll 504 can include a first film 100g wound lengthwise about a tube roll 502. As shown, the first film 100g can be folded in half lengthwise. Furthermore, the first film 100g can include a folded edge and first and second opposing portions extending from the folded edge. The stock roll 504 can also include a second film 100e wound lengthwise about the tube roll 502. As shown, the second film 100e can be folded in half lengthwise. Furthermore, the second film 100e can include a folded edge and first and second opposing portions extending from the folded edge. As shown by FIG. 6D, the second film 100e is positioned within the first film 100g.

In addition to the foregoing, the folded edge of the first film 100g is positioned proximate the folded edge of the second film 100e to form the folded edge 630. The first opposing portion of the first film 100g is positioned proximate the first opposing portion of the second film 100e. Similarly, the second opposing portion of the first film 100g is positioned proximate the second opposing portion of the second film 100e.

One advantage the method described in FIGS. 6A-6D provides over the method described in FIGS. 4A-4D is that the inner surface 640 of the flat tube 312 (FIG. 6A) can form the inner layer of the multi-layer composite folded films 110c, 110d (FIG. 6D). Similarly, the outer surface 642 of the flat tube 312 (FIG. 6A) can form the outer layer of the multi-layer composite folded films 110c, 110d (FIG. 6D).

One will appreciate in light of the disclosure herein that the ability to maintain inner and outer surfaces in the multi-layer composite folded films, and thus the stock roll 504, can provide a number of advantages. For example, when the flat tube 312 is formed from a coextruded three-layer C:A:B structure in which the C and B layers include different colors or properties, the manufacturer can ensure that the C layer forms the outer layer of any double-walled bag and that the B layer forms the inner layer of any double-walled bag or vice versa. This can allow the manufacturer to control the properties of the inner and outer layers of a double-walled bag.

Such combination of properties of two folded films may have beneficial effects in the resulting composite and for products, such as trash or food bags, which are manufactured with the composite folded films. Additionally, the processes and apparatus disclosed herein may provide benefits in the manufacturing process for producing a composite folded film by reducing the time, floor space, and complexity of inserting one folded film into another folded film. The reduction in the time, floor space, and complexity for inserting one folded film into another folded film, in turn, can result in efficiencies and cost savings for the production of films and products.

Figure 7A:
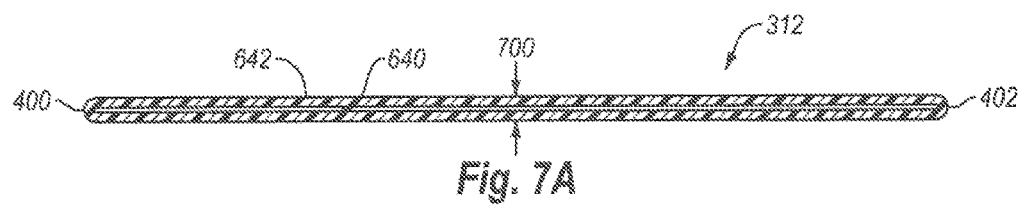
FIGS. 7A-7D illustrates steps in yet another process for forming multi-layer composite folded films from the blow-formed continuous film tube formed in the extruder of FIG. 2 in accordance with one or more implementations of the present invention.
Figure 7B:
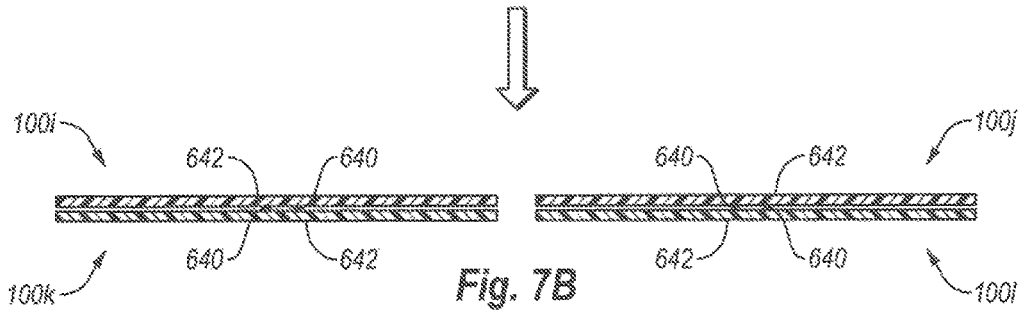

FIGS. 7A-7D illustrate another method of forming multi-layer composite folded films that can be wound to form stock rolls 504 including a folded film within another folded film. Specifically, a manufacturer can slit the flat tube 312 at the first edge 400 and the second edge 402. Additionally, the manufacturer can slit the flat tube 312 down the center 700. Thus, the slit flat tube 312 can form four flat films 100$i$, 100$j$, 100$k$, 100$l$ as shown by FIGS. 7A-7B. As shown by FIGS. 7A-7B, each of the flat films 100$i$, 100$j$, 100$k$, 100$l$ can include a first side 642 corresponding to outer surface of the flat tube 312, and a second side 640 corresponding to the inner surface of the flat tube 312. As previously explained, in one or more implementations the film forming the flat tube can comprise a C:A:B structure in which the C and B layers have different colors or properties. For example, in one implementation side 642 is black and side 640 is white.

To ensure the black side 642 forms the outer surface and the white side 640 forms the inner surface of the multi-layer composite folded film, or vice versa, the manufacturer can flip one or more of the flat films 100$i$, 100$j$, 100$k$, 100$l$. For example, FIG. 7C illustrates that the manufacturer has flipped films 100$k$ and 100$l$ so that the black side of films 100$k$, 100$l$ face the white sides 640 of films 100$i$, 100$j$.

Figure 7C:
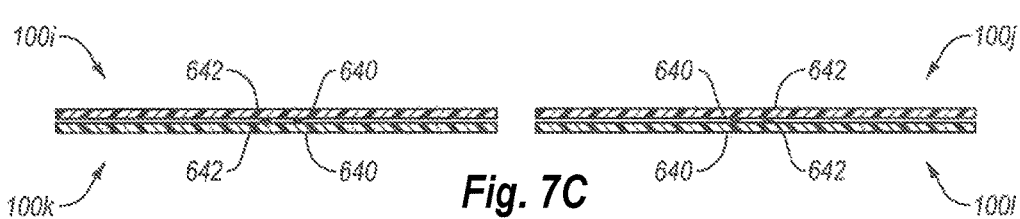

Once the films 100$i$, 100$j$, 100$k$, 100$l$ are aligned as shown in FIG. 7C, a manufacturer can then pass each of the pairs of flat films over respective v-boards to form multi-layer composite folded films 110$e$ and 110$f$. The resulting multi-layer composite folded films 110$e$, 110$f$ are each comprised of a second folded film 100$k$, 100$l$ inserted within a first folded film 100$i$, 100$j$. The resulting multi-layer composite folded films 110$e$, 110$f$ each have a folded edge 730, 732 and opposing open ends 734, 736. The manufacturer can then wind each multi-layer composite folded film 110$e$, 110$f$ onto a film tube roll 502 at a winder 500 to form a stock roll 504 including a folded film within another folded film, as shown by FIG. 5.

Figure 7D:
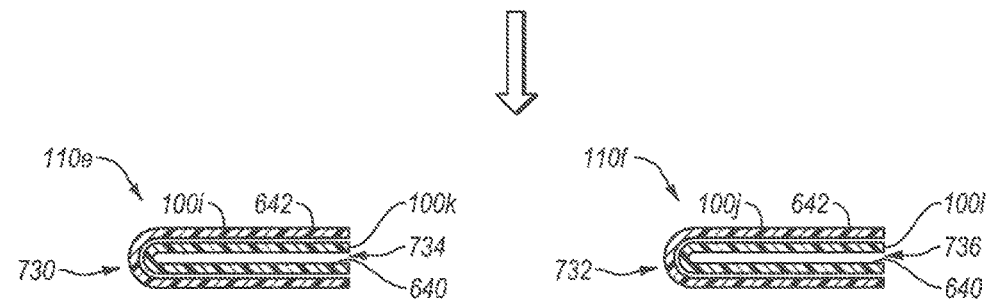

Similar to the method described in FIGS. 6A-6D, the method described in FIGS. 7A-7D can ensure that the inner surface 640 of the flat tube 312 (FIG. 7A) forms the inner layer of the multi-layer composite folded films 110$e$, 110$f$ (FIG. 7D). Similarly, the outer surface 642 of the flat tube 312 (FIG. 7A) can form the outer surface 642 of the multi-layer composite folded films 110$e$, 110$f$ (FIG. 7D). As mentioned above, this can allow a manufacturer to use the multi-layer composite folded films 110$e$, 110$f$ to form bag-in-bag structures with a white inner layer and a black outer layer or vice versa.

Figure 8:
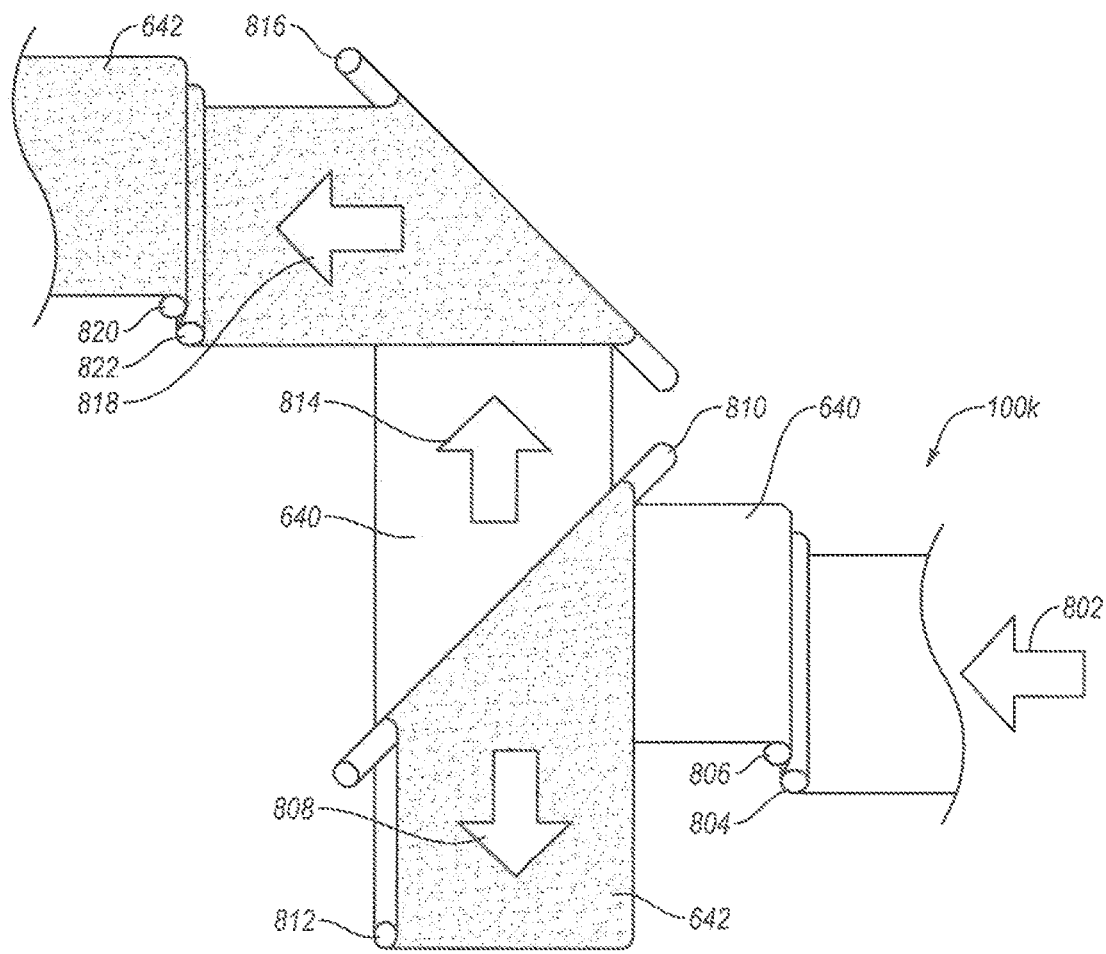
FIG. 8 illustrates a process and apparatus for flipping a film in accordance with an implementation of the present invention.

Referring now to FIG. 8, a method of flipping a continuous film is illustrated. A manufacturer can use the method shown in FIG. 8 to flip the films 100$k$, 100$i$ as described above in relation to FIGS. 7B-7C. As shown by FIG. 8, to flip the film 100$k$, a manufacturer can advance the film 100$k$ in a first direction of travel 802. In one or more implementations the first direction of travel 802 may be parallel to a machine direction, or in other words, the direction in which the film 100$k$ was extruded. While traveling in the first direction of travel 802, the film 100$k$ can pass about a pair of rollers 804, 806. The rollers 804, 806 can comprise S-wrap rollers as shown in FIG. 8 or simple idler rollers. In any event, the rollers 804, 806 can be appropriately arranged to grasp and/or tension the film 100$k$.

After passing from the roller 806, the manufacturer can redirect the film 100$k$ from the first direction of travel 802 to a second direction of travel 808. In particular, the film 100$k$ can change directions from the first direction of travel 802 to the second direction of travel 808 by passing about a direction change bar or roller 810. The direction change bar 810 can change the direction of travel of the film 100$k$. More specifically, the film 100$k$ can pass initially on a first side of the direction change bar 810 and then pass about the direction change bar 810 so the film 100$k$ leaves a second opposing side of the direction change bar 810.

One will appreciate in light of the disclosure herein that the direction change bar 810 can comprise a number of different configurations. For example, FIG. 8 illustrates that the direction change bar 810 can comprise a cylinder. In alternative implementations, the direction change bar 810 may be a flat bar with a tapered edge, or may be a roller with a rolling direction to accommodate the direction of travel of film 100$k$. Thus, in the implementation shown in FIG. 8, the direction change bar 810 can rotate in a clockwise direction. The direction change bar 810 can be made of cast and/or machined metal, such as, steel, aluminum, or any other suitable material. Optionally, the direction change bar 810 can be coated with a material such as a rubber or urethane. Still further, the direction change bar 810 can optionally have an air bearing assist or plasma coating to reduce friction.

FIG. 8 further illustrates that the direction change bar 810 can extend in a direction at an angle of about 45 degrees relative to direction 802. Thus, as film 100$k$ passes over direction change bar 810, direction change bar 810 can effect a change in direction of travel of film 100$k$ of 90 degrees. In other words, after passing about the direction change bar 810, film 100$k$ can travel in a direction 808 that is perpendicular to the first direction of travel 802. Additionally as shown in FIG. 8, the direction change bar 810 can flip the film 100$k$ over so that the black side 642 is facing up.

Next the film 100$k$ can pass over one or more orientation rollers 812. For example, FIG. 8 illustrates that an orientation roller 812 can redirect the film 100$k$ from travelling in the second direction 808 to a third direction 814. As shown by FIG. 8, the third direction of travel 814 can extend in an opposite direction (i.e., 180 degrees relative) to the second direction of travel 808. The orientation roller 812 can also flip the film 100$k$ over so that the white side 640 is facing up.

After passing from the orientation roller 812, the film 100$k$ can pass about another direction change bar 816. The direction change bar 816 can change the direction of travel of the film 100$k$ in a manner similar to that of direction change bar 810. Furthermore, direction change bar 816 can have a similar configuration to that of direction change bar 810. More specifically, film 100$k$ can pass initially on a first side of the direction change bar 816 and then pass about the direction change bar 816 so film 100$k$ leaves a second opposing side of the direction change bar 816.

FIG. 8 further illustrates that the change bar 816 can extend in direction oriented at an acute angle relative to the direction 814. For example, the change bar 816 can extend at an angle of 45 degrees relative to the direction 814. In any event, as film 100$k$ passes over direction change bar 816, direction change bar 816 can effect a change in direction of travel of film 100$k$ such that film 100$k$, after passing about the direction change bar 816, travels in a direction 818 perpendicular to the third direction of travel 814 and parallel to the first direction of travel 802. Additionally, as shown in FIG. 8 the direction change bar 816 can also flip the film 100*k* over so that the black side 642 is facing up. With the black side 642 facing up, the film 100*k* can then be positioned under film 100*i* and then folded to form the multi-layer composite folded film 110*e* as described in relation to FIGS. 7C-7D.

FIG. 8 further illustrates that after passing about the direction change bar 816, the film 100*k* can pass through another pair of idler rollers or s-wrap rollers 820, 822. One will appreciate that the s-wrap rollers 804, 806, 820, 822 or alternatively idler rollers positioned both at the beginning and end of the process illustrated in FIG. 8 can help reduce and otherwise control wrinkle and tension issues. In one or more implementations, the system and associated method can exclude the s-wrap rollers 804, 806, 820, 822.

One will appreciate that the flipping process illustrated in FIG. 8 can add to the length of travel of film 100*k*. To help maintain equal path lengths, thereby reducing the likelihood of uneven tension issues, the manufacturer can similarly pass film 100*i* through one or more idler rollers or other mechanisms to ensure that both films 100*k* and 100*i* have equal, or approximately equal, path lengths.

Figure 9A:
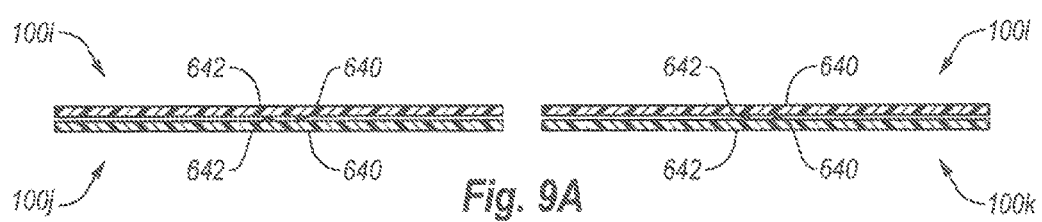
FIGS. 9A-9B illustrates steps in still another process for forming multi-layer composite folded films from the blow-formed continuous film tube formed in the extruder of FIG. 2 in accordance with one or more implementations of the present invention.

In still another implementation, the process of FIGS. 7A-7B can be modified to avoid the need to pass films 100*k*, 100*l* through a flipping process. For example, FIG. 9A illustrates that the four flat films shown in FIG. 7B can be repositioned so that film 100*j* is positioned under film 100*i*. Similarly, film 100*l* can be positioned over film 100*k*.

Once the films 100*i*, 100*j*, 100*k*, 100*l* are aligned as shown in FIG. 9A, a manufacturer can then pass each of the pairs of flat films over respective v-boards to form multi-layer composite folded films 110*g* and 110*h*. In particular, a manufacturer can fold film 100*i* over film 100*j* to form multi-layer composite folded film 100*g*. Along similar lines, the manufacturer can fold film 100*k* over film 100*l* to form multi-layer composite folded film 100*h*.

The resulting multi-layer composite folded films 110*g*, 110*h* are each comprised of a folded film 100*j*, 100*l* inserted within another folded film 100*i*, 100*k*. The resulting multi-layer composite folded films 110*g*, 110*h* each have a folded edge 830, 832 and opposing open ends 834, 836. The manufacturer can then wind each multi-layer composite folded film 110*g*, 110*h* onto a film tube roll 502 at a winder 500 to form a stock roll 504 including a folded film within another folded film, as shown by FIG. 5.

Figure 9B:
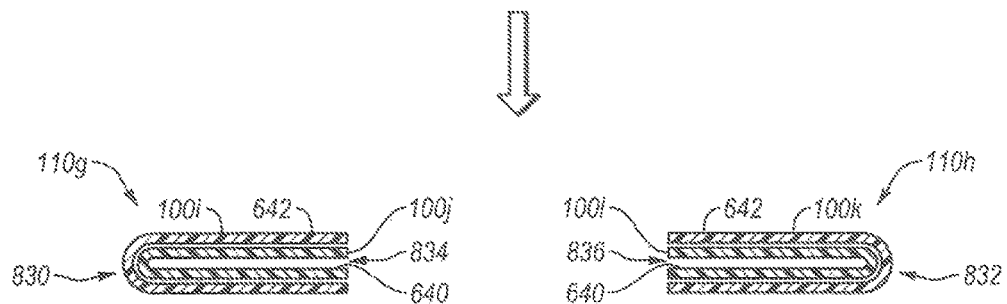

Similar to the method described in FIGS. 6A-6D, the method described in FIGS. 7A, 7B, 9A, and 9B can ensure that the inner surface 640 of the flat tube 312 (FIG. 7A) forms the inner surface of the multi-layer composite folded films 110*g*, 110*h* (FIG. 9B). Similarly, the outer surface 642 of the flat tube 312 (FIG. 7A) can form the outer surface of the multi-layer composite folded films 110*g*, 110*h* (FIG. 9B). As mentioned above, this can allow a manufacturer to use the multi-layer composite folded films 110*e*, 110*f* to form bag-in-bag structures with an inner layer of a first color (e.g., white) and an outer layer of a different color (e.g., black). If a multi-layer composite folded film is desired with a white outer layer and a black inner layer, one will appreciate that a manufacturer can fold film 110*j* over film 100*i* instead of folding film 100*i* about 100*j* as described above. In order to maintain equal path lengths, the manufacturer can translate each of the films 100*i*, 100*j*, 100*k*, 100*l* to the center line for the overlap and folding steps. This can help maintain equal path lengths for each of the films and reduce the likelihood of uneven tension issues.

One will appreciate in light of the disclosure herein that the multi-layer composite folded film can form part of any type of product made from, or incorporating, thermoplastic films. For instance, grocery bags, trash bags, sacks, packaging materials, feminine hygiene products, baby diapers, adult incontinence products, sanitary napkins, bandages, food storage bags, food storage containers, thermal heat wraps, facial masks, wipes, hard surface cleaners, and many other products can include multi-layer composite folded film. Trash bags and food storage bags may be particularly benefited by the multi-layer composite folded films of the present invention.

Figure 10A:
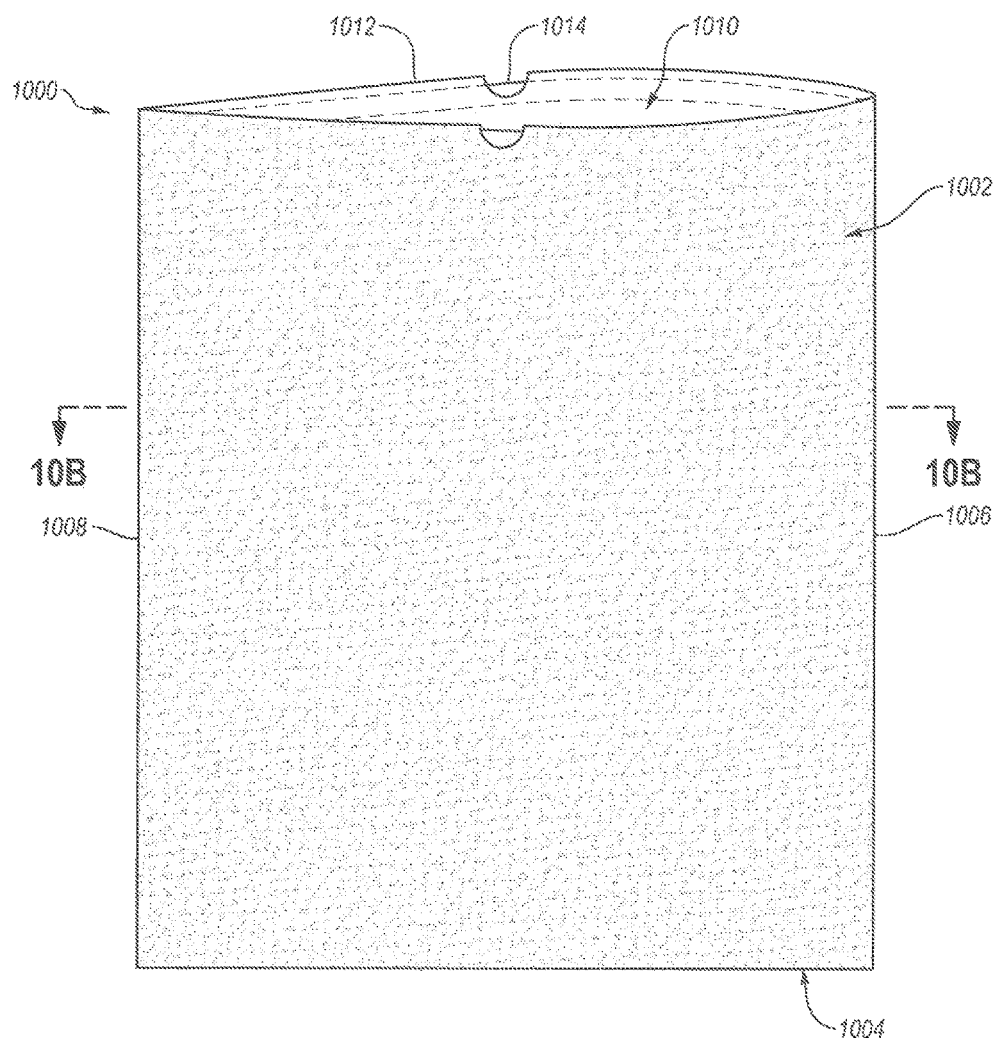
FIG. 10A illustrates a bag incorporating a multi-layer composite folded film in accordance with one or more implementations of the present invention.

Referring to FIG. 10A, in a particular implementation of the present invention, the multi-layer composite folded film 110*c*, as illustrated in FIG. 6D, may be incorporated in a bag construction. The bag 1000 can include a bag body 1002 formed from a piece of a multi-layer composite folded film 110*c*. The bag bottom 1004 can coincide with the folded edge 630 of the multi-layer composite of folded film 110*c*. Side seams 1006 and 1008 can bond the sides of the bag body 1002 together to form a semi-enclosed container having an opening 1010 along an open edge 1012 (which corresponds to open edge 634 of multi-layer composite folded film 110*c*). The bag 1000 also optionally includes closure means 1014 located adjacent to the open edge 1012 for sealing the top of the bag to form a fully-enclosed container or vessel. The bag 1000 is suitable for containing and protecting a wide variety of materials and/or objects. The closure means 1014 can comprise a draw tape as shown in FIG. 10A or optionally comprise flaps, adhesive tapes, a tuck and fold closure, an interlocking closure, a slider closure, a zipper closure or other closure structures known to those skilled in the art for closing a bag.

Figure 10B:
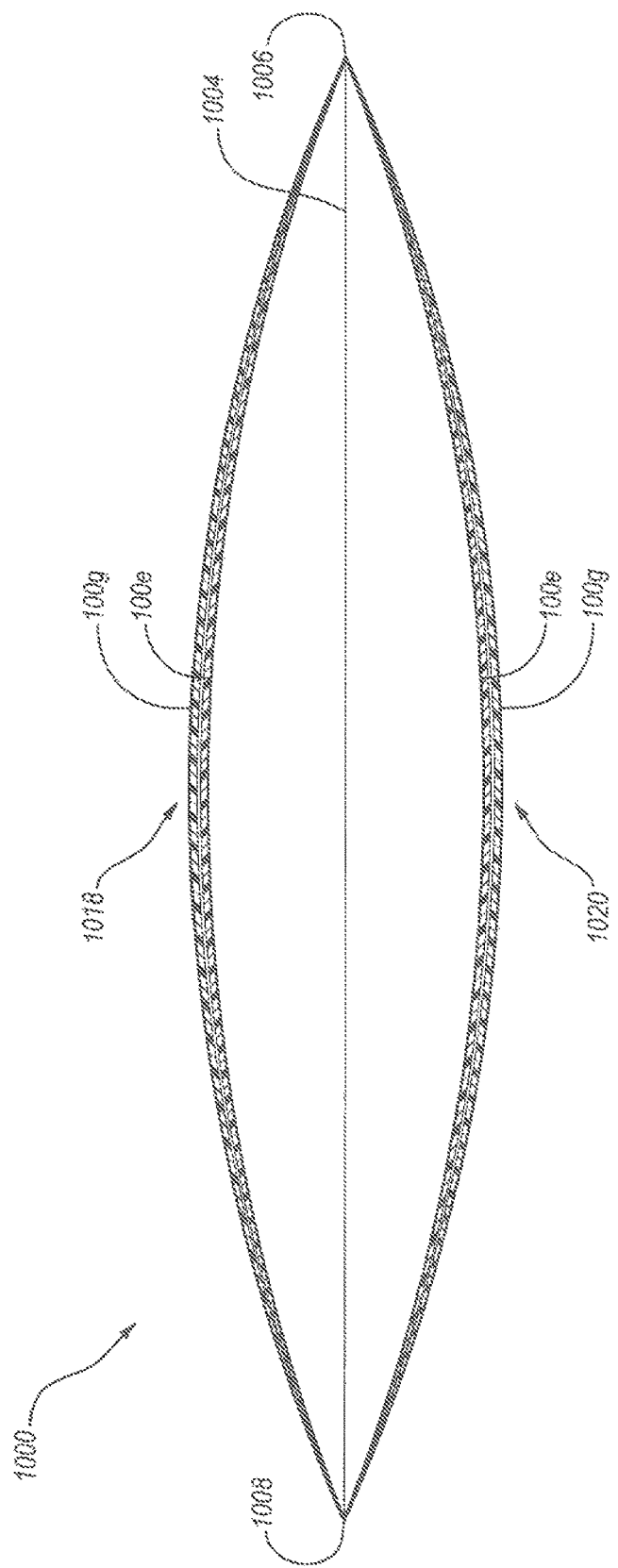
FIG. 10B illustrates a cross-sectional view of the bag of FIG. 10A taken along the line 10B-10B of FIG. 10A.

As shown by FIG. 10B, the bag 1000 can include a first side wall 1018 and a second side wall 1020. Each side wall 1018, 1020 can comprise at least two layers. For example, FIG. 10B illustrates that the film 100*g* can form the outer layer of both side walls 1018, 1020. Film 100*e* on the other hand can form the inner layer of the side walls 1018, 1020. Seals 1006, 1008 can join the edges of films 100*g*, 100*e* adjacent the bag bottom (i.e., folded edge 1004). The bag 1000 created from multi-layer composite folded film 110*c* may increase tear and impact resistance and can help prevent the bag from tearing and losing the contents therein.

Figure 11:
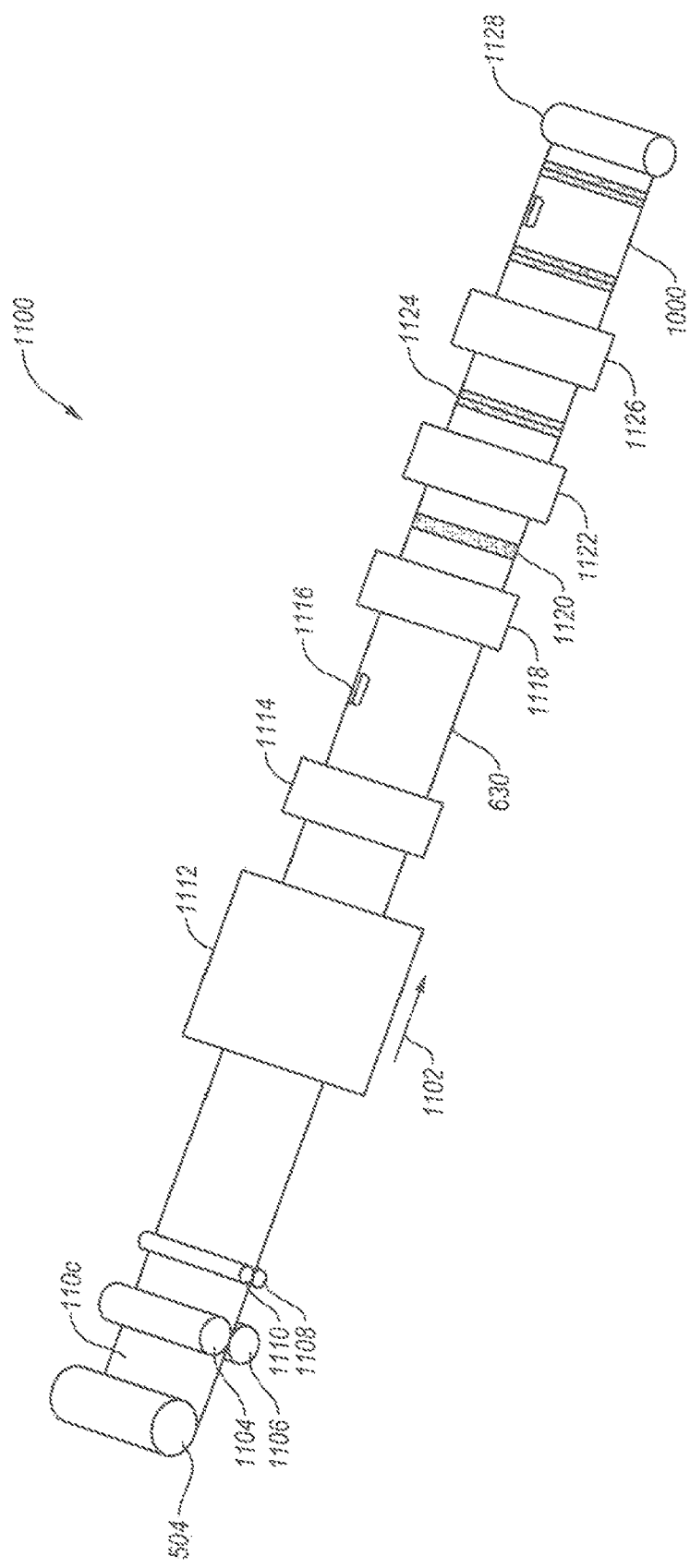
FIG. 11 illustrates a schematic diagram of a bag manufacturing process in accordance with one or more implementations of the present invention.

FIG. 11 illustrates an exemplary implementation of a manufacturing process 1100 for creating a bag-in-bag structure (such as bag 1000) using a stock roll 504 including a folded film nested within another folded film. According to the process 1000, a multi-layer composite folded film 110*c* is unwound from the stock roll 504 and directed along a direction of travel 1102. Direction of travel 1102 may be along the machine direction.

Multi-layer composite folded film 110*c* can optionally pass between one or more sets of intermeshing rollers 1104, 1106 to incrementally stretch the multi-layer composite folded film 110*c*. Incrementally stretching the multi-layer composite folded film 110*c* can modify and/or increase one or more of the physical properties of the multi-layer composite folded film 110*c* and/or increase the surface area of the multi-layer composite folded film 110*c* and/or reduce the gauge of the multi-layer composite folded film 110*c*. Furthermore, incrementally stretching the multi-layer composite folded film 110*c* can provide the multi-layer composite folded film 110*c* with a visual pattern that can serve to notify a consumer that the multi-layer composite folded film 110*c* has been processed to enhance one or more properties.

The intermeshing rollers 1104, 1106 can be machine-direction ring rolls, transverse-direction ring rolls, diagonal-direction ring rolls, structural elastic like film (SELF) rollers, embossing rollers, or other intermeshing rollers. The intermeshing rollers 1104, 1106 may be arranged so that their longitudinal axes are perpendicular to the machine direction. Additionally, the intermeshing rollers 1104, 1106 may rotate about their longitudinal axes in opposite rotational directions. In various implementations, motors may be provided that power rotation of the intermeshing rollers 1104, 1106 in a controlled manner. As the multi-layer composite folded film 110c passes between the intermeshing rollers 1104, 1106, ridges and/or teeth of the intermeshing rollers 1104, 1106 can stretch the multi-layer composite folded film 110c.

A number of U.S. patents have issued for incrementally stretching thermoplastic films and laminates. An early example of the patent art that discloses a method of incrementally stretching film is U.S. Pat. No. 5,296,184. Other relevant patents regarding the incremental stretching of thermoplastic films and laminates include U.S. Pat. Nos. 6,265,045; 6,214,147; 6,013,151; 5,865,926; 5,861,074; 5,851,937; 5,422,172; 5,382,461; 5,518,801; 6,139,185; 6,150,647; 6,394,651; 6,394,652; 6,513,975; 6,695,476; and U.S. Patent Application Publication Nos. 2004/0134923 and 2006/0093766. Each of the forgoing patents and patent applications are hereby incorporated by reference in their entirety.

Additionally, or alternatively, to incremental stretching, the process 1100 can include orienting the multi-layer composite folded film 110c. For example, the process 1100 can include machine direction orient (MDO) the multi-layer composite folded film 110c by passing them between two pairs of smooth rollers. The nip of the first pair of rollers, which are running at a relatively slow speed, can pinch the multi-layer composite folded film 110c. The nip of a second pair of rollers downstream from the first pair, which are operating faster than the first pair, and then pinch the multi-layer composite folded film 110c. Because of the difference in run speeds, the film in between the roller pairs must either stretch or break to accommodate the difference.

The ratio of the roller speeds will roughly determine the amount that the film is stretched. For example, if the first pair is running at 100 feet per minute (fpm) and the second pair is running at 300 fpm, the film will be stretched to roughly three times it original length. The MDO method stretches the film continuously in the machine direction (MD) only. The MDO stretching method is used to create an MD oriented film. Optionally, the process 1100 can include tentering the multi-layer composite folded film 110c. In simplest terms, the tentering method involves grabbing the sides of the film and stretching it sideways.

During the manufacturing process 1100, the multi-layer composite folded film 110c can also pass through pairs of pinch rollers 1108, 1110. The pinch rollers 1108, 1110 can be appropriately arranged to grasp the multi-layer composite folded film 110c. The pinch rollers 1108, 1110 may facilitate and accommodate the multi-layer composite folded film 110c.

Alternatively, the process 1100 can include a lamination operation 1112. Lamination operation 1112 can continuously or discontinuously laminate the layers of the multi-layer composite folded film 110c together. As a verb, "laminate" means to affix or adhere (by means of, for example, adhesive bonding, pressure bonding, ultrasonic bonding, corona lamination, and the like) two or more separately made film articles to one another so as to form a multi-layer structure; as a noun, "laminate" means a product produced by the affixing or adhering just described. Thus, in one or more implementations, lamination operation 1112 can include laminating the layers of the multi-layer composite folded film 110c together by passing them through machine-direction ring rolls, transverse-direction ring rolls, diagonal-direction ring rolls, SELF'ing rollers, embossing rollers, or other intermeshing rollers.

To produce a finished bag, the processing equipment (i.e., bag making machine) may further process the multi-layer composite folded film 110c after it emerges from the intermeshing rollers 1104, 1106 and/or lamination operation 1112. In particular, a draw tape operation 1114 can insert a draw tape 1116 into the composite folded film 110c at the open edge. Furthermore, a sealing operation 1118 can form the parallel side edges of the finished bag by forming heat seals 1120 between adjacent portions of the multi-layer composite folded film 110c. The heat seals 1120 may be incrementally spaced apart along the multi-layer composite folded film 110c. The sealing operation 1118 can form the heat seals 1120 using a heating device, such as, a heated knife.

A perforating operation 1122 may form a perforation 1124 in the heat seals 1120 using a perforating device, such as, a perforating knife. The perforations 1124 in conjunction with the folded edge 630 can define individual bags 1000 that may be separated from the modified composite folded film 110c. A roll or spool 1128 can wind the modified composite folded film 110c embodying the finished bags 1000 for packaging and distribution. For example, the roll 1128 may be placed into a box or bag for sale to a customer.

In still further implementations, the multi-layer composite folded film 110c may be cut into individual bags along the heat seals 1120 by a cutting operation 1126. In another implementation, the multi-layer composite folded film 110c may be folded one or more times prior to the cutting operation 1126. In yet another implementation, the side sealing operation 1118 may be combined with the cutting and/or perforation operations 1122, 1126.

One will appreciate in light of the disclosure herein that the process 1100 described in relation to FIG. 11 can be modified to omit or expanded acts, or vary the order of the various acts as desired. For example, in one or more additional implementations the multi-layer composite folded film 110c may not be oriented or stretched. In yet additional implementations, the multi-layer composite folded film 110c may be oriented or stretched.

Accordingly, FIGS. 1-11 and the corresponding text, therefore, specifically show, describe, or otherwise provide a number of systems, components, apparatus, and methods for making a stock roll having a folded film nested within another folded film. There are several advantages associated a multi-layer composite folded film created in accordance with one or more implementations of the present invention. The methods and apparatus described herein result in conservation of floor space in manufacturing thereby resulting in lowered capital costs. The methods and apparatus described herein disclose a simpler process design than previously available resulting in better reliability, and less wrinkles in the resulting product(s) due to a reduction in the process steps required since individual folding and unfolding of webs is not required. As the methods and apparatus described herein may decrease the time and complexity for inserting a folded film into another folded film, manufacturers can decrease the cost of their products if they use the one or more of the methods and apparatus described herein. These cost savings may be significant.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method for forming a stock roll including a folded film inserted within another folded film, the method comprising:
    slitting a thermoplastic tube to form a first continuous thermoplastic film and at least a second continuous thermoplastic film;
    folding one or more of the first continuous thermoplastic film and the at least a second continuous thermoplastic film to form a multi-layer composite folded film comprising an inner folded layer and an outer folded layer folded about the inner folded layer, wherein the multi-layer composite folded film comprises a first end at which first terminal ends of the inner folded layer and the outer folded layer are aligned, an opposing second end, and a folded edge at which both the inner folded layer and the outer folded layer are folded over each other at a mid-point between the first end and the second end such that the first and second ends are aligned; and
    winding the multi-layer composite folded film about a tube roll.

2. The method as recited in claim 1, wherein slitting a thermoplastic tube to form a first continuous thermoplastic film and at least a second continuous thermoplastic film comprises slitting opposing edges of thermoplastic tube to form a first continuous flat film and a second continuous flat film.

3. The method as recited in claim 2, wherein folding one or more of the first thermoplastic film and the at least a second thermoplastic film to form a multi-layer composite folded film comprising an inner folded layer and an outer folded layer folded about the inner folded layer comprises:
    folding the first flat film approximately in half to form a first folded film; and
    folding the first folded film approximately in half to form the multi-layer composite folded film.

4. The method as recited in claim 1, wherein slitting a thermoplastic tube to form a first continuous thermoplastic film and at least a second continuous thermoplastic film comprises slitting the thermoplastic tube at first and second positions between opposing edges of the thermoplastic tube to form a first continuous folded film, a second continuous folded film, a first continuous flat film, and a second continuous flat film.

5. The method as recited in claim 4, wherein folding one or more of the first thermoplastic film and the at least a second thermoplastic film to form a multi-layer composite folded film comprising an inner folded layer and an outer folded layer folded about the inner folded layer comprises folding the first flat continuous film about the first continuous folded film to form the multi-layer composite folded film.

6. The method as recited in claim 1, wherein slitting a thermoplastic tube to form a first continuous thermoplastic film and at least a second continuous thermoplastic film comprises slitting the thermoplastic tube in half and at opposing edges to form a first continuous flat film, a second continuous flat film, a third continuous flat film, and a fourth continuous flat film.

7. The method as recited in claim 6, wherein folding one or more of the first thermoplastic film and the at least a second thermoplastic film to form a multi-layer composite folded film comprising an inner folded layer and an outer folded layer folded about the inner folded layer comprises folding the third continuous flat film about the first continuous flat film to form the multi-layer composite folded film.

8. The method as recited in claim 7, further comprising flipping the third continuous flat film prior to folding the third continuous flat film about the first continuous flat film.

9. The method as recited in claim 8, wherein flipping the third continuous flat film comprises:
    directing the third continuous flat film about a first change of direction bar to change the direction of the third continuous flat film 90 degrees and to flip the third continuous flat film;
    directing the third continuous flat film about a orientation roller to change the direction of the third continuous flat film 180 degrees; and
    directing the third continuous flat film about a second change of direction bar to change the direction of the third continuous flat film 90 degrees and to flip the third continuous flat film.

10. The method as recited in claim 6, wherein folding one or more of the first thermoplastic film and the at least a second thermoplastic film to form a multi-layer composite folded film comprising an inner folded layer and an outer layer folded about the inner folded layer comprises folding the first flat continuous film about the second continuous flat film to form the multi-layer composite folded film.

11. The method as recited in claim 1, wherein:
    the thermoplastic tube comprises a tri-layered film;
    an outer surface of the tri-layered film has a first color; and
    an inner surface of the tri-layered film has a second color.

12. The method as recited in claim 11, wherein:
    an outer surface of the multi-layer composite folded film has the first color; and
    an inner surface of the multi-layer composite folded film has the second color.

13. A method for forming a stock roll including a folded film inserted within another folded film, the method comprising:
    extruding a thermoplastic tube;
    slitting the thermoplastic tube to form a first continuous thermoplastic film and at least a second continuous thermoplastic film;
    folding one or more of the first continuous thermoplastic film and the at least a second continuous thermoplastic film at a mid-point to form a multi-layer composite folded film comprising an inner folded layer and an outer folded layer, the folded outer layer folded about the inner folded layer, wherein the multi-layer composite folded film comprises a first end at which first terminal ends of the inner folded layer and the outer folded layer are aligned and an opposing second end aligned with and positioned over the first end; and
    winding the multi-layer composite folded film about a tube roll.

14. The method as recited in claim 13, wherein slitting the thermoplastic tube to form the first continuous thermoplastic film and the at least a second continuous thermoplastic film comprises slitting opposing edges of thermoplastic tube to form a first continuous flat film and a second continuous flat film.

15. The method as recited in claim 14, wherein folding one or more of the first thermoplastic film and the at least a second thermoplastic film to form a multi-layer composite folded film comprising an inner folded layer and an outer folded layer folded about the inner folded layer comprises:
   folding the first flat film approximately in half to form a first folded film; and
   folding the first folded film approximately in half to form the multi-layer composite folded film.

16. The method as recited in claim 13, wherein slitting a thermoplastic tube to form a first continuous thermoplastic film and at least a second continuous thermoplastic film comprises slitting the thermoplastic tube at first and second positions between opposing edges of the thermoplastic tube to form a first continuous folded film, a second continuous folded film, a first continuous flat film, and a second continuous flat film.

17. The method as recited in claim 16, wherein folding one or more of the first thermoplastic film and the at least a second thermoplastic film to form a multi-layer composite folded film comprising an inner folded layer and an outer folded layer folded about the inner folded layer comprises folding the first flat continuous film about the first continuous folded film to form the multi-layer composite folded film.

18. The method as recited in claim 13, wherein slitting the thermoplastic tube to form the first continuous thermoplastic film and the at least a second continuous thermoplastic film comprises slitting the thermoplastic tube in half and at opposing edges to form a first continuous flat film, a second continuous flat film, a third continuous flat film, and a fourth continuous flat film.

19. The method as recited in claim 18, wherein folding one or more of the first thermoplastic film and the at least a second thermoplastic film to form a multi-layer composite folded film comprising an inner folded layer and an outer folded layer folded about the inner folded layer comprises folding the third continuous flat film about the first continuous flat film to form the multi-layer composite folded film.

20. The method as recited in claim 19, further comprising flipping the third continuous flat film prior to folding the third continuous flat film about the first continuous flat film by:
   directing the third continuous flat film about a first change of direction bar to change the direction of the third continuous flat film 90 degrees and to flip the third continuous flat film;
   directing the third continuous flat film about a orientation roller to change the direction of the third continuous flat film 180 degrees; and
   directing the third continuous flat film about a second change of direction bar to change the direction of the third continuous flat film 90 degrees and to flip the third continuous flat film.

* * * * *